United States Patent [19]

Moore

[11] 4,366,370
[45] Dec. 28, 1982

[54] MOTOR/GENERATOR ARMATURE PORTABLE BAKING OVEN

[76] Inventor: James L. Moore, 6416 The Parkway, Alexandria, Va. 22310

[21] Appl. No.: 120,820

[22] Filed: Feb. 12, 1980

[51] Int. Cl.$^3$ ............................................. H05B 3/58
[52] U.S. Cl. ................................... 219/535; 219/400
[58] Field of Search ............... 219/390, 535, 373, 400, 219/369, 209

[56] References Cited

U.S. PATENT DOCUMENTS

| | | | |
|---|---|---|---|
| 1,147,396 | 7/1915 | Hawley et al. | 219/535 |
| 1,316,190 | 9/1919 | Sackerman | 219/535 |
| 1,352,893 | 9/1920 | Guice . | |
| 2,426,976 | 9/1947 | Taulman | 219/535 |
| 2,706,988 | 4/1955 | Weber | 219/373 |
| 3,417,486 | 12/1968 | Vanicek . | |
| 3,539,771 | 11/1970 | Zeiser | 219/373 |
| 3,786,162 | 1/1974 | Colson | 219/390 |

Primary Examiner—Bernard Roskoski
Attorney, Agent, or Firm—R. F. Beers; L. A. Marsh

[57] ABSTRACT

A portable oven for baking a motor or generator armature or other electrical winding mounted on a shaft for use in a process for cleaning and reinsulating the armature without removing the shaft from the operating environment. The oven is formed in the shape of a closed, hollow cylinder which encloses the armature and is supported by the armature shaft. The shaft is suspended horizontally on rotating hubs and moved longitudinally to project the armature out of the motor/generator casing. Support collars are attached to the shaft on either side of the armature. Wedge-shaped sections are attached to the collars to form circular ends of the cylindrical oven. Arcuate-shaped body members are attached between the ends to enclose a cylindrical surface. Each body member is furnished with heaters and perforated baffles for evenly heating the armature. An air inlet is formed in one of the wedge-shaped end sections and an air outlet is formed in one of the arcuate-shaped body members.

1 Claim, 5 Drawing Figures

4,366,370

MOTOR/GENERATOR ARMATURE PORTABLE BAKING OVEN

STATEMENT OF GOVERNMENT INTEREST

The invention described herein may be maufactured and used by or for the Government of the United States of America for governmental purposes without the payment of any royalties thereon or therefor.

BACKGROUND OF THE INVENTION

The present invention relates to a portable baking oven, and more particularly to a portable baking oven for baking a generator armature or other electrical winding mounted on a shaft in a process for cleaning and reinsulating the armature without removing it from the operating environment.

Shipboard electrical generators such as AC/DC motor generator sets, main power generators, auxilary power generators, or other electrical windings mounted on a shaft normally require cleaning and reinsulating of the armature windings after extended periods of use. Presently, the cleaning of a generator armature is accomplished by cutting an access hole through the side of the surface vessel or submarine containing the generator or motor and removing the armature from the operating environment to a shore facility for cleaning, drying, reinsulating, and curing of the insulation. The drying of the armature and curing of the insulation are done in large ovens which can encompass an armature rotor.

Removing the armature from the vessel or submarine is time consuming, expensive and disrupts the watertight integrity of the vessel or submarine hull. These disadvantages also prevent use of the present shore facility ovens for shipboard applications. In addition, the shore facility ovens are too large and bulky for adaption to the cramped operating environment found in the engine room of a surface vessel or submarine.

SUMMARY OF THE INVENTION

Accordingly, in the present invention there is disclosed a portable oven for baking a motor/generator armature or other electrical winding mounted on a shaft in a process for cleaning and reinsulating the armature without removing it from the operating environment.

The oven is formed in the shape of a closed, hollow cylinder which completely encloses the armature and is in turn supported by the armature shaft.

An extension member is attached to the end of the rotor opposite the armature end. Rotating hubs are attached to the extension and to the armature end of the shaft. The shaft is suspended from overhead by the rotating hubs and moved axially or longitudinally with respect to the generator casing until the portion of the shaft having the armature is out of the casing. The armature is now in a position to be manually cleaned with a cleaning solution such as soap and water using a high pressure, airless spray gun. After cleaning, the portable oven is assembled around the armature and the residual moisture is removed by baking.

Support collars are attached to the shaft on either side of the armature. Wedge-shaped sections are attached to the collars to form the circular ends of the cylindrical oven. One of the wedge-shaped sections is furnished with an aperture that serves as an air inlet.

Arcuate-shaped body members or segments are attached between the circular ends to enclose the cylindrical surface. One of the body members is furnished with an aperture which serves as an air outlet. Each of the body members is provided with heaters and a perforated baffle for even heating of the armature. The body members are also provided with various spacers which enable the members to enclose various sized armatures. With the oven assembled to enclose the armature, the armature is baked to remove the residual moisture from cleaning.

After the armature has been dried, the uppermost body members are removed from the oven and the armature is reinsulated with varnish using the high pressure, airless spray gun to apply the varnish. The shaft is rotated on the hubs until the entire armature has been reinsulated. The body members are replaced to enclose the armature which is baked to cure the varnish.

OBJECTS OF THE INVENTION

It is therefore an object of the present invention to provide an oven for baking a motor/generator armature or other electrical winding which can be used on armatures of varying size.

Another object of the invention is to provide an oven for an armature which is compact, portable, lightweight and thus suitable for shipboard use.

Another object of the invention is to provide a portable oven for baking a motor/generator armature without removing the armature from the operating environment.

A further object of the invention is to provide a portable baking oven for use in a process for cleaning and reinsulating a motor/generator armature without removing the armature from the operating environment.

A still further object of the invention is to provide a portable baking oven for use in a shipboard process of cleaning and reinsulating an armature to improve the insulation resistance of the armature.

Other objects, advantages and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DESCRIPTION OF THE PREFERRED EMBODIMENTS

Figure 1:
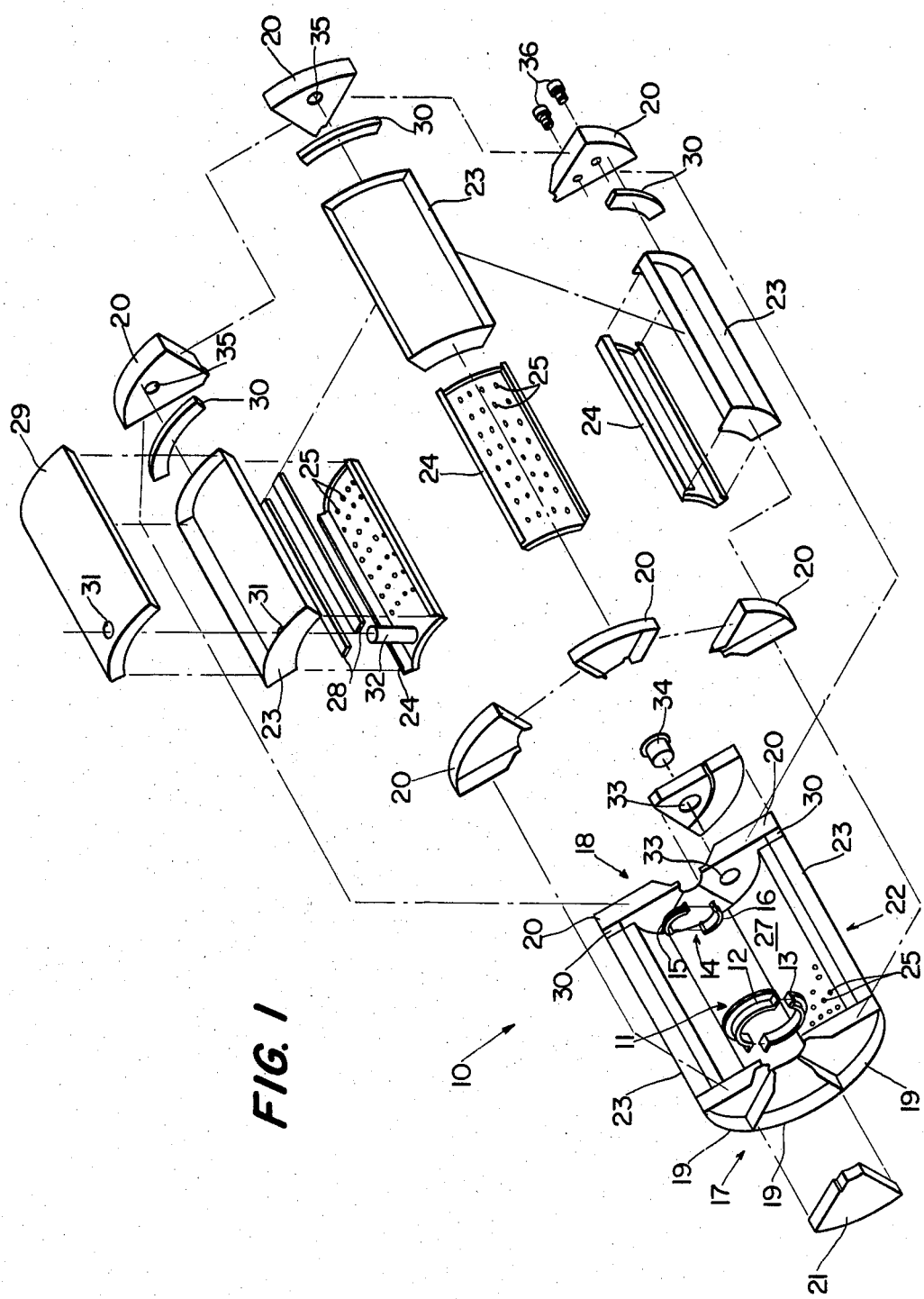
FIG. 1 shows an exploded isometric view of the oven according to the present invention.
Figure 5:
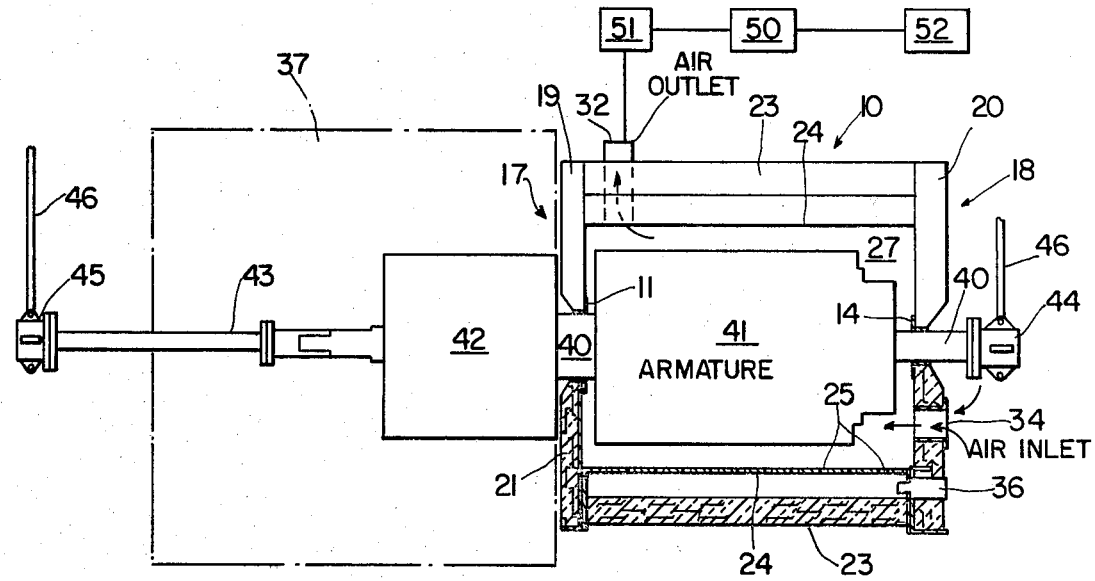
FIG. 5 shows a longitudinal cross-section of the oven enclosing the armature taken along line 5—5 of FIG. 2.

Referring to FIG. 1, there is illustrated an exploded isometric view of the generator oven 10. The oven is constructed with front support collar 11, formed by collar halves 12 and 13, and rear support collar 14, formed by collar halves 15 and 16. As shown in FIG. 5, the front and rear support collars are attached to rotor shaft 40 on either side of the armature 41. The collar halves are attached to grip the shaft by threaded fasteners or other suitable attachment means. The support collars may be designed in various sizes to enable the oven to be used with various sized armature shafts.

Figure 2:
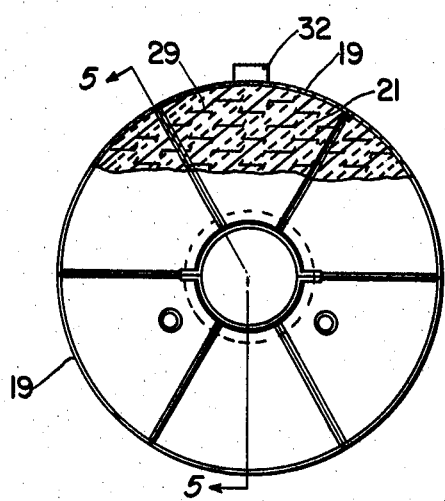
FIG. 2 shows a front view of the oven with a partial cutaway section.

Referring again to FIG. 1, the front and rear circular ends of the oven, 17 and 18 respectively, are formed by a plurality of wedge-shaped front sections 19 and a plurality of wedge-shaped rear sections 20. Front sections 19 are attached to front support collar 11 and to the adjacent front sections by threaded fasteners (not shown) or other suitable attachment means to form front end 17. Rear sections 20 are attached to rear support collar 14 and to the adjacent rear sections by threaded fasteners (not shown) or other suitable attachment means to form rear end 18. As shown in FIGS. 1 and 2, each front section 19 and rear section 20 is formed to receive a wedge-shaped insulating pad 21 which improves the heat retention characteristics of oven 10.

The body 22 of the oven is enclosed by a plurality of arcuate-shaped body members 23 which are each attached between one of the plurality of front sections 19 and the opposed one of the plurality of rear sections 20 by threaded fasteners (not shown) or other suitable attachment means. The body members are also attached on either side to the adjacent body members.

Figure 4:
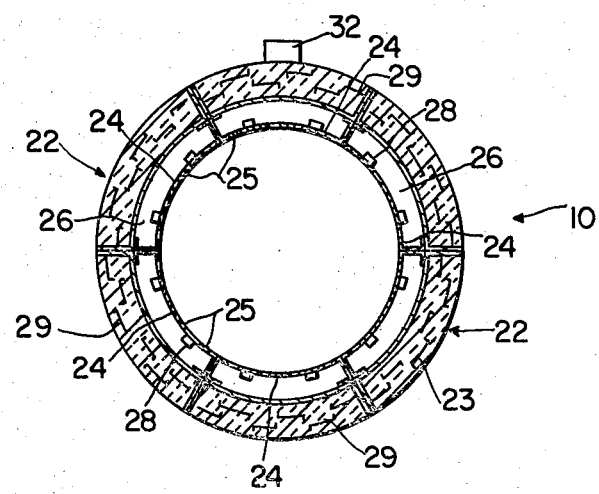
FIG. 4 shows a simplified cross-section taken along line 4—4 of FIG. 3.

As shown in FIG. 1, and better illustrated in FIG. 4, each body member 23 is provided with baffle 24 positioned on the inward facing surface of the body member and extending the length of the body member so as to form space 26 between body member 23 and the associated baffle. Each baffle is provided with a plurality of perforations 25 which allow air to circulate from spaces 26 to the interior of oven 27. One or more electrical heaters 28 are mounted in each of the spaces 26 so as to be positioned around the circumference of the oven to evenly distribute heat to oven interior 27 through perforations 25. The perforated baffles aid in evenly distributing the heat in the oven and also protect the heaters from physical damage during assembly of the oven. Electrical power to the heaters is supplied by electrical connections through each body member in insulated tubes 35 which protect the connections and prevent heat loss. The heaters and electrical circuitry are designed with parallel redundancy to provide a secondary capability in the event of failure in the primary heater circuit.

Figure 3:
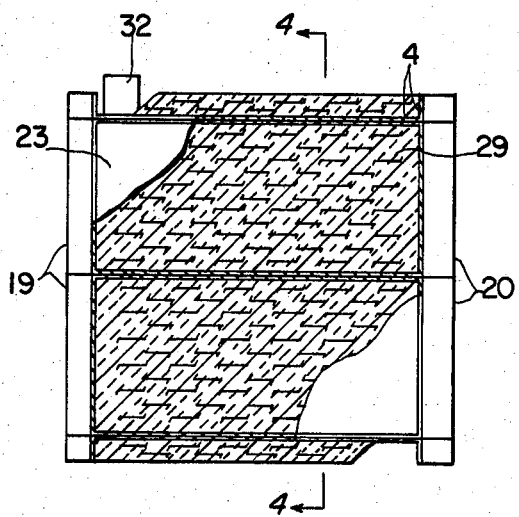
FIG. 3 shows a side view of the oven with a partial cutaway section.

Each body member 23 is shaped to receive an insulating blanket 29, shown in FIG. 3, on its outward, arcuate-shaped face which improves the heat retention characteristics of the oven. The body members may also be provided with insulated arcuate-shaped spacers 30 which can be positioned between each body member and the corresponding front or rear wedge-shaped section. The spacers may be used to extend the length of the oven when it is necessary for the oven to encompass an armature of greater length.

One of the plurality of body members 23, together with its associated baffle 24 and insulating blanket 29, is provided with aligned apertures 31 in which is mounted air outlet 32, shown in FIGS. 1-5. One of the plurality of front or rear wedge-shaped sections, together with the associated insulating pad 21, is provided with apertures 33 in which is mounted air inlet 34. The air inlet and outlets are positioned at opposed extremities of the oven so as to provide air circulation across the length of the oven to carry off the residual moisture which has been vaporized by heaters 28. It is to be understood that the relative positions of the air inlet and air outlet could be reversed so as to provide the inlet in a body member and outlet in the wedge-shaped section. Air flow in the oven is generated by attaching a ventilation fan 50 to the oven air outlet by flexible ducting. The fan may be mounted external to the vessel or submarine hull. The exhaust air from the fan discharge may be cooled in a mixing chamber 52 and then discharged to the atmosphere. A damper 51 can be provided in the air outlet line to regulate air flow.

As illustrated in FIGS. 1, 2 and 5, one of the plurality of rear, wedge-shaped sections 20 along with associated insulation pad 21 is provided with thermocouple tubes 36 for the positioning of thermocouple sensors to monitor the temperatures in the oven structure. It is to be understood that such sensors may be positioned at various points in the oven, as necessary. Tubes 36 are insulated to protect the thermocouple connections and prevent heat loss. Additional thermocouple sensors (not shown) are also attached to the armature shaft, to directly monitor the temperature of the shaft, and the interior of the oven.

The oven is provided with a control panel (not shown) which allows the oven operator to control power to the electrical heater circuits and ventilation fan and to monitor oven temperatures via panel instrumentation and a selective thermocouple switch. The control panel is also provided with high temperature visual and audible alarms and a high temperature shutdown switch interlocked with the heater control circuit and ventilation control circuit. The temperature shutdown switch prevents operation of the heaters and provides automatic shutdown of the heaters if the temperature of the rotor exceeds a set value or if the ventilation fan is secured. The shutdown switch does not reset until the temperature falls below the set value and the switch is manually reset.

Referring to FIG. 5, there is illustrated a cross-sectional view of the oven encompassing an armature 41 during the baking process. Prior to assembly of the oven on the armature, it is necessary to free armature shaft 40 from generator housing 37 so that the shaft may be suspended from overhead. The area directly in front of housing 37 is cleared of interference so that the rotor may be moved longitudinally, with respect to the housing, until the armature is outside of the housing.

As shown in FIG. 5, shaft 40 supports both the generator armature 41 and the prime mover 42. In the illustrated embodiment, prime mover 42 is an A.C. motor driving the armature.

An extension member 43 is attached to one end of shaft 40 adjacent to the prime mover. The extension member may be threadedly attached directly to the shaft or attached by threaded fasteners or other suitable attachment means (not shown). A first rotatable hub 44 is attached to a second end of shaft 40 adjacent the armature, and a second rotatable hub 45 is attached to extension member 43. Hubs 44 and 45 are threadedly attached to the shaft and enable the shaft to be suspended horizontally by suspension members 46 which are attached between the hubs and the overhead. The hubs permit the shaft to be rotated 360° during reinsulating of the armature. The suspension members can be a pair of trolleyed chain falls (not shown) which allow the shaft to be moved in both horizontal and vertical directions. Extension member 43 permits the shaft to be moved in the horizontal direction without interference of the housing with the suspension member. It is to be understood that some armatures and housings will permit the armature to be moved vertically out of the housing prior to construction of the oven around the armature.

After the shaft has been suspended by means of hubs 44 and 45, it is moved horizontally until armature 41 is free of housing 37. It is contemplated that some operating environments will permit the armature and shaft to be moved completely out of the housing. The armature may now be washed with a cleaning solution such as soap and water, non-ionic detergent and water, or other equivalent cleaning compound, using a high pressure, airless spray gun and supply system. The oven is then assembled to enclose the armature, as shown in FIG. 5, for baking out the residual moisture from the washing.

With the oven assembled the ventilation fan is energized and the damper adjusted to provide the desired air circulation. The heaters are energized to raise the armature and shaft temperature. To heat the armature gradually while maintaining the oven temperature below 500° F., the heaters will have to be secured for brief periods of time (10-15 min.). After 6-8 hours the armature will reach the drying/baking temperature of 260°-270° F. and can be baked for approximately 12 hours to remove the residual moisture. After drying and cooling, the armature is tested for insulation resistance.

Upper body members 23 of the oven are removed to allow reinsulating or varnishing of armature 41 using the high pressure, airless spray gun. The electrical insulating varnish or other equivalent insulation material is applied to armature 41 while rotating armature shaft 40 through 360° to ensure complete coverage. When the armature is varnished, body members 23 are replaced to enclose the armature and the armature is again baked to cure the varnish. The armature and shaft are brought up to temperature over a period of 6-8 hours and then baked for 12 hours at 290°-300° F.

It is apparent that the disclosed bake oven provides a portable oven for baking a motor/generator armature or other electrical winding mounted on a shaft in a process for cleaning and reinsulating the armature. The oven is compact, portable, lightweight and enables the armature to be cleaned and reinsulated without being removed from the operating environment.

Obviously, many modifications and embodiments of the specific invention other than those set forth above, will readily come to mind to one skilled in the art having the benefit of the teachings presented in the foregoing description and the accompanying drawings of the subject invention and hence it is to be understood that the invention is not limited thereto and that such modifications are intended to be included within the scope of the appended claims.

What is claimed is:

1. A portable oven for surrounding an object mounted on a shaft, such as the armature of a motor, for the purpose of baking the object without removing it from the shaft, said oven comprising:
 a container comprising:
   front and rear end members formed from a plurality of wedge-shaped sections which are removably fitted together, said end members being adapted to be removably mounted on a shaft, and
   a body member formed from a plurality of composite sections removably fitted together for location between and supported by said end members so that the container mounts on and is supported by said shaft to contain said object,
 each body section comprising an inner baffle segment formed with holes therethrough for circulation of air, a body segment adapted to be fitted to said baffle segment with a space therebetween and an insulation segment adapted to cover the surface area of said body segment thereby to minimize escape of heat therethrough,
 means in said container for heating the object within the interior of said container;
 air inlet means connecting the inside of said container with the outside atmosphere; and
 air outlet means extending through the three segments of at least one said body section and connecting the inside of said container with the outside atmosphere, said air outlet means being adapted for coupling to air exhaust means.

* * * * *